Figure 1:
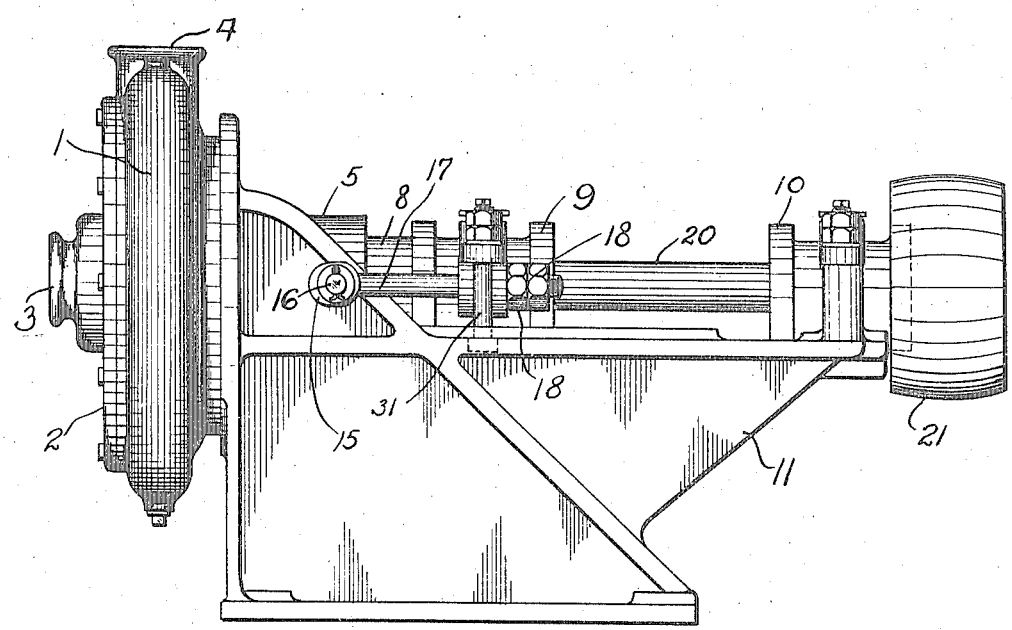

INVENTOR
JOHN B. KEATING
ROBERT SCHORR
BY F. M. Wright,
ATTORNEY

UNITED STATES PATENT OFFICE.

JOHN B. KEATING, OF OAKLAND, AND ROBERT SCHORR, OF SAN FRANCISCO, CALIFORNIA, ASSIGNORS TO BYRON JACKSON IRON WORKS, OF WEST BERKELEY, CALIFORNIA, A CORPORATION OF CALIFORNIA.

FRAME FOR ROTARY MACHINERY.

1,263,561.　　　　　　Specification of Letters Patent.　　Patented Apr. 23, 1918.

Application filed May 9, 1917.　Serial No. 167,530.

*To all whom it may concern:*

Be it known that we, JOHN B. KEATING and ROBERT SCHORR, citizens of the United States, residing, respectively, at Oakland, county of Alameda, and San Francisco, county of San Francisco, and State of California, have invented new and useful Improvements in Frames for Rotary Machinery, of which the following is a specification.

The present invention relates to improvements in the general construction of centrifugal or rotary pumps, compressors and the like.

The majority of such machines are very defective in regard to the arrangement for the intake of the fluid and to the accessibility to stuffing boxes and bearings.

The main object of the present invention is to provide an efficient device in a compact construction without reducing the accessibility to the stuffing boxes. A further object is to avoid reliance for successful operation, upon bearing sleeves located inside of the pump, which are obviously subject to great wear, and are furthermore not open to inspection.

There are two distinct types of such machines on the market, first, those which have the driving shaft supported by bearings located on both sides of the rotor, and, second, those with a bearing sleeve close to the rotor and inside of the housing and with one or two bearings situated on the outside, all bearings being on one side of the rotor only.

The first arrangement above referred to has the following disadvantages:—

1. The rotor shaft traverses the inlet-elbow, thus causing undesirable entrance disturbances and consequently drop in efficiency.

2. As a liberal space between stuffing boxes and bearings is necessary to permit of repacking, such an arrangement leads to unduly great structural length.

3. The machine-work is expensive, as the bearings are seated on separate elements and not in a single self-contained frame.

4. For a reliable outlet two stuffing boxes are required, because, otherwise, one bearing must be accommodated within the suction elbow, which is not recommendable for obvious reasons.

The second arrangement above mentioned has the following disadvantages:—

1. It is necessary to leave a fair space between the stuffing boxes and the nearer outside bearing to permit of repacking. This, in turn, establishes a prohibitive distance between the center line of the rotor and the center line of the nearer bearing. It becomes, therefore, imperative to place a bearing sleeve adjacent to the rotor and ahead of the stuffing box. This bearing sleeve must be well lubricated and in perfect condition, otherwise trouble will result from excessive shaft-deflection at the rotor-hub. The overhang of the rotor will then be actually the distance between its center line and the center line of the nearer outside bearing. The inside bearing sleeve will wear very rapidly if gritty or corrosive fluids are handled.

2. The pump has to be partially dismantled to allow inspection of the bearing sleeve.

The specific purposes of the present invention may be summarized as follows:—

1. To render the successful operation entirely independent of the condition in which the inside bearing sleeve may be, by reducing the overhang of the rotor to a minimum.

2. To arrange the stuffing box and bearings in the most accessible manner without increasing the structural length.

3. To entirely eliminate the inside bearing sleeve, when handling gritty or corrosive fluid.

4. To provide a rotor having an unobstructed inlet.

5. To provide a rotor with bearings in a self-contained frame unit in order to facilitate machining and to insure accurate alinement.

6. To provide a rotor having only one stuffing box and to make the stuffing box a part of the rotor housing in order to simplify the shopwork and obtain standardization.

7. To provide a rotor with a bearing frame adaptable for rotors and housings therefor of different sizes.

8. To provide a construction which will permit of making a double pump unit by keying a rotor at each end of a shaft without adding bearings.

Figure 2:
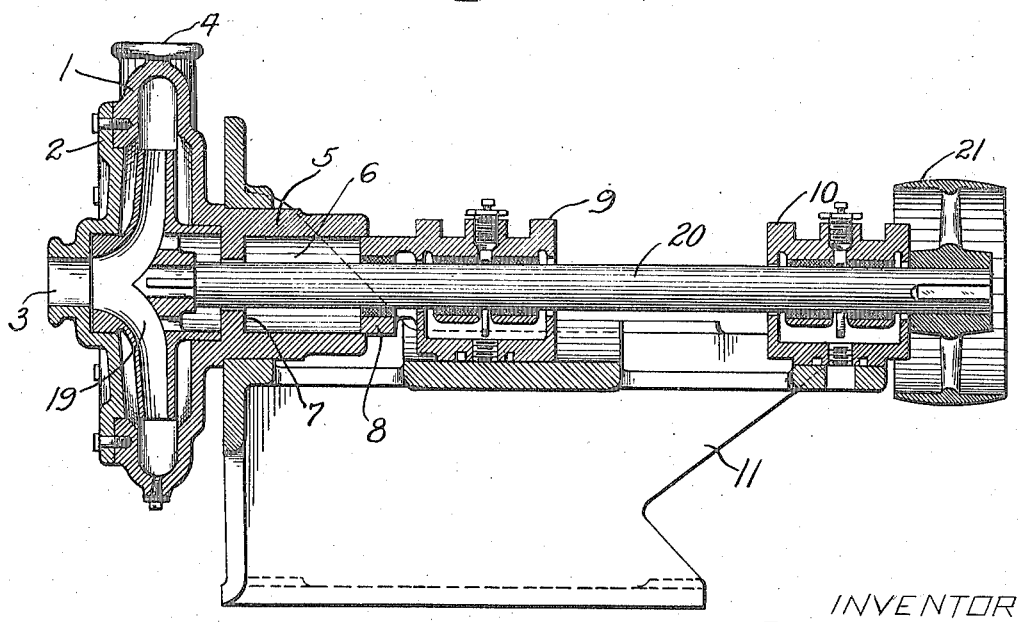
Figure 3:
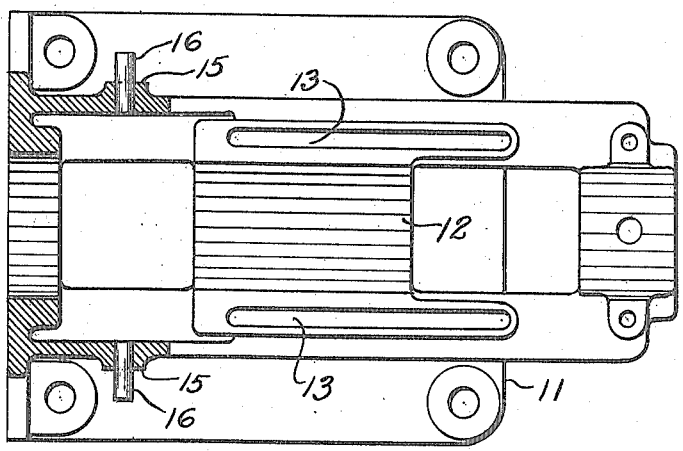
Figure 4:
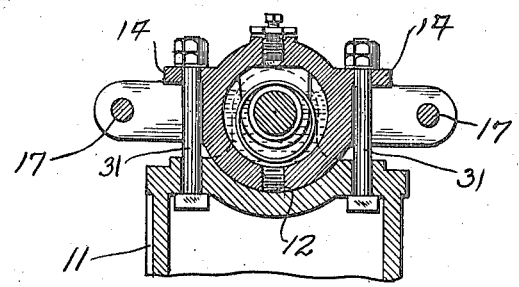
Figure 5:
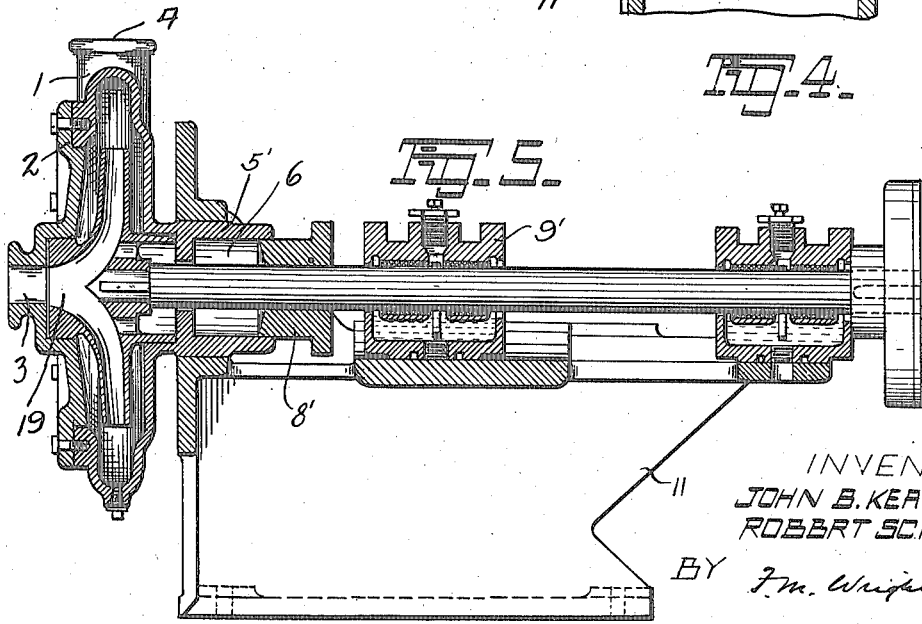

In the accompanying drawings, Figure 1 is a side elevation of a preferred form of the invention; Fig. 2 is a longitudinal section thereof and Fig. 3 is a plan of the base; Fig. 4 is a cross section through the stuffing box bearing; and Fig. 5 is a view, similar to Fig. 2, of a modification of the invention for use with corrosive fluids.

Referring to the drawings, 1 indicates a rotor housing, having a cover 2, a fluid-inlet 3 and a fluid-outlet 4. The housing-neck 5 has a bore 6 to act as a stuffing box, and a bearing-sleeve may, or may not, be placed at the partition wall 7. The stuffing box gland 8 may form a part of a slidably mounted bearing 9, or it may be a separate element. A stationary bearing 10, the slidable bearing 9 and the housing neck 5 are supported by a frame 11, which has a saddle-seat 12 and bolt-slots 13 for bolts 31 extending upwardly through wings 14 projecting from the sides of the bearing 9 to permit of adjusting the bearing 9 longitudinally. Side cheeks 15 of the frame 11 carry pins 16 for eyebolts 17 which extend through front and rear wings 14 projecting from the slidable bearing 9. Nuts 18 on the ends of said bolts and engaging the rear wings 14 adjustably hold said bearing at the proper distance from the rotor housing.

A rotor 19 is keyed to one end of a driving shaft 20, which carries at its other end a pulley 21 or a coupling for direct connection to a motor.

The gland 8 is forced against the packing of the stuffing box by moving the bearing 9 toward the rotor, and, by moving the same in the opposite direction, a space becomes available between the gland and the stuffing-box to enable repacking of the latter.

It will be perceived that the above arrangement permits of the smallest possible distance between the rotor and the nearer bearing, thus reducing the "overhang" to a practical minimum.

In Fig. 5 is shown a slight modification of the arrangement. It consists in keeping the stuffing box gland 8' entirely separate and distinct from the slidable bearing 9'. Such a disposition is advisable in pumps for pumping corrosive fluid in order to avoid the possibility of said fluid reaching the slidable bearing 9'.

Other modifications are possible, as is also the grouping of two pumps on one double bearing frame such as that herein described, by fastening a second rotor where the pulley 21 is now shown and by placing a driving pulley or gear between the bearings 9 and 10.

We claim:—

1. In combination with a pump rotor and its housing and shaft, and a stuffing box for the shaft, a bearing for the shaft, movable to and from the housing.

2. In combination with a pump rotor, its shaft, and its housing formed with a stuffing box, a bearing for the shaft adjacent to the stuffing box, and movable to and from the housing.

3. In combination with a pump rotor, its housing, shaft and stuffing box, a slidably mounted bearing for the shaft adjacent to the stuffing box, and a gland forming a part of the slidable bearing.

4. In combination with a pump rotor, its housing, shaft, and stuffing box, a slidably mounted bearing for the shaft, adjacent to the stuffing box, and means for moving said slidable bearing longitudinally.

5. In combination with a pump rotor, its housing, shaft, and stuffing box, a slidably mounted bearing for the shaft, a stationary bearing therefor, both bearings being located on the same side of the rotor, and a frame supporting both bearings.

JOHN B. KEATING.
ROBERT SCHORR.